(12) United States Patent
Cupp (10) Patent No.: US 6,918,986 B2
(45) Date of Patent: Jul. 19, 2005

(54) METHOD AND APPARATUS FOR TRIMMING PLASTIC SEAMS

(76) Inventor: John P. Cupp, 1115 Bloomdale Rd., Philadelphia, PA (US) 19115

( * ) Notice: Subject to any disclaimer, the term of this patent is extended or adjusted under 35 U.S.C. 154(b) by 157 days.

(21) Appl. No.: 10/254,901

(22) Filed: Sep. 25, 2002

(65) Prior Publication Data
US 2004/0055434 A1 Mar. 25, 2004

(51) Int. Cl.[7] .............................................. B29C 65/18
(52) U.S. Cl. ................. 156/304.6; 156/267; 156/309.9; 156/517; 156/556; 156/499; 156/503; 156/358; 156/158; 156/159; 49/479.1; 49/495.1; 269/152; 425/108; 277/314; 277/603; 277/605
(58) Field of Search .............................. 49/479.1, 495.1; 269/152; 425/108; 277/314, 603, 605; 156/158, 159, 258, 287, 267, 304.6, 308.4, 309.9, 358, 499, 503, 517, 556, 558, 559

(56) References Cited

U.S. PATENT DOCUMENTS

| | | | |
|---|---|---|---|
| 3,604,483 A | | 9/1971 | Nissen |
| 4,239,574 A | * | 12/1980 | Aust et al. .................. 156/267 |
| 4,752,350 A | | 6/1988 | Schuster |
| 5,855,720 A | | 1/1999 | Johnson et al. |
| 5,902,447 A | | 5/1999 | Johnson et al. |
| 6,056,033 A | | 5/2000 | Schwaiger |

FOREIGN PATENT DOCUMENTS

DE   2612670   * 9/1977

* cited by examiner

Primary Examiner—Linda Gray
(74) Attorney, Agent, or Firm—Volpe and Koenig P.C.

(57) ABSTRACT

Method and apparatus for trimming plastic frames. Frames are joined to bring heated, soften ends into engagement, causing some softened material to be forced out from between the engaged portions, forming a flashing. This flashing is trimmed by a pair of trimming blades moved along associated guide members. The trimming assembly is mounted directly upon clamps holding the frame members, enabling performance of the trimming operation and eliminating the need for moving to a separate trimming/finishing station remote from the joining equipment. Excellent cutting action is assured by locking the guide blocks preparatory to a trimming operation. Various combinations and sequences of repetitive trimming operations may be selected whereby the cooperating blades are moved in selective cooperating directions to provide a trimming operation which avoids the need for further finishing. Trimming may also be performed simultaneously on multiple stacks of members being joined using the above technique.

32 Claims, 10 Drawing Sheets

AUTOTRIM SEQUENCE

| STEP | TIMING | | ACTIVITY | DURATION |
|---|---|---|---|---|
| | | | CYCLE STARTS AFTER 4 INPUTS AGREE | |
| 1 | After | 0.5 | HEADS LOCK | 0.5 |
| 2 | After | 0.5 | BOTH TRIM KNIVES EXTEND | 1 |
| 3 | After | 5 | LEFT TRIM KNIFE RETRACTS | 6 |
| 4 | After | 1 | LEFT TRIM KNIFE EXTENDS | 7 |
| 5 | After | .05 | RIGHT TRIM KNIFE RETRACTS | 7.5 |
| 6 | After | 1 | RIGHT TRIM KNIFE EXTENDS | 8.5 |
| 7 | After | 1 | BOTH TRIM KNIVES EXTEND | 9.5 |
| 8 | After | 3 | BOTH TRIM KNIVES RETRACT | 12.5 |
| 9 | After | .05 | BOTH TRIM KNIVES EXTEND | 13 |
| 10 | After | 3 | LEFT TRIM KNIFE RETRACTS | 16 |
| 11 | After | 1 | LEFT TRIM KNIFE EXTENDS | 17 |
| 12 | After | 0.5 | RIGHT TRIM KNIFE RETRACTS | 17.5 |
| 13 | After | 1 | RIGHT TRIM KNIFE EXTENDS | 18.5 |
| 14 | After | 1 | BOTH TRIM KNIVES EXTEND | 22.5 |
| 15 | After | 3 | BOTH TRIM KNIVES RETRACT | 23.5 |
| 16 | After | 1 | BOTH TRIM KNIVES EXTEND | 27.5 |
| 17 | After | 4 | BOTH TRIM KNIVES RETRACT | 28.5 |
| 18 | After | 1 | BOTH TRIM KNIVES EXTEND | 33.5 |
| 19 | After | 5 | BOTH TRIM KNIVES RETRACT | 34.5 |
| 20 | After | 1 | BOTH TRIM KNIVES EXTEND | 39.5 |
| 21 | After | 5 | BOTH TRIM KNIVES RETRACT | 40.5 |
| 22 | After | 1 | BOTH TRIM KNIVES EXTEND | 45.5 |
| 23 | After | 5 | BOTH TRIM KNIVES RETRACT | 45.5 |
| 24 | After | 1 | BOTH TRIM KNIVES EXTEND | 46.5 |
| 25 | After | 5 | BOTH TRIM KNIVES RETRACT | 51.5 |

1. Counter records cycle. (Not displayed)
2. Replace battery indicator LED.
3. System activated indicator LED.
4. Sharpen knives LED triggered by predetermined number of cycles. (20,000)

Fig. 11a

AUTOTRIM SEQUENCE

| STEP | TIMING | | ACTIVITY | DURATION |
|---|---|---|---|---|
| | | | CYCLE STARTS AFTER 4 INPUTS AGREE | |
| 1 | After | 0.5 | HEADS LOCK | 0.5 |
| 2 | After | 0.5 | BOTH TRIM KNIVES EXTEND | 1 |
| 3 | After | 0.5 | BOTH TRIM KNIVES RETRACT | 1.5 |
| 4 | After | 0.5 | LEFT TRIM KNIFE EXTENDS | 2 |
| 5 | After | 0.5 | LEFT TRIM KNIFE RETRACTS | 2.5 |
| 6 | After | 0.5 | BOTH TRIM KNIVES EXTEND | 3 |
| 7 | After | 0.5 | BOTH TRIM KNIVES RETRACT | 3.5 |
| 8 | After | 0.5 | RIGHT TRIM KNIFE EXTENDS | 4 |
| 9 | After | 0.5 | RIGHT TRIM KNIFE RETRACTS | 4.5 |
| 10 | After | 0.5 | BOTH TRIM KNIVES EXTEND | 5 |
| 11 | After | 0.5 | LEFT TRIM KNIFE RETRACTS | 5.5 |
| 12 | After | 0.5 | LEFT TRIM KNIFE EXTENDS | 6 |
| 13 | After | 0.5 | RIGHT TRIM KNIFE RETRACTS | 6.5 |
| 14 | After | 0.5 | LEFT TRIM KNIFE EXTENDS | 7 |
| 15 | After | 0.5 | BOTH TRIM KNIVES RETRACT | 7.5 |
| 16 | After | 0.5 | BOTH TRIM KNIVES EXTEND | 8 |
| 17 | After | 0.5 | LEFT TRIM KNIFE RETRACTS | 8.5 |
| 18 | After | 0.5 | LEFT TRIM KNIFE EXTENDS | 9 |
| 19 | After | 0.5 | RIGHT TRIM KNIFE RETRACTS | 9.5 |
| 20 | After | 0.5 | LEFT TRIM KNIFE EXTENDS | 10 |
| 21 | After | 0.5 | BOTH TRIM KNIVES RETRACT | 10.5 |
| 22 | After | 0.5 | BOTH TRIM KNIVES EXTEND | 11 |
| 23 | After | 0.5 | BOTH TRIM KNIVES RETRACT | 11.5 |
| 24 | After | 0.5 | LEFT TRIM KNIFE EXTENDS | 12 |
| 25 | After | 0.5 | LEFT TRIM KNIFE RETRACTS | 12.5 |
| 26 | After | 0.5 | BOTH TRIM KNIVES EXTEND | 13 |
| 27 | After | 0.5 | BOTH TRIM KNIVES RETRACT | 13.5 |
| 28 | After | 0.5 | RIGHT TRIM KNIFE EXTENDS | 14 |
| 29 | After | 0.5 | RIGHT TRIM KNIFE RETRACTS | 14.5 |
| 30 | After | 0.5 | BOTH TRIM KNIVES RETRACT | 15 |
| 31 | After | 0.5 | BOTH TRIM KNIVES RETRACT | 15.5 |
| 32 | After | 0.5 | LEFT TRIM KNIFE EXTENDS | 16 |
| 33 | After | 0.5 | LEFT TRIM KNIFE RETRACTS | 16.5 |
| 34 | After | 0.5 | BOTH TRIM KNIVES EXTEND | 17 |
| 35 | After | 0.5 | BOTH TRIM KNIVES RETRACT | 17.5 |

METHOD AND APPARATUS FOR TRIMMING PLASTIC SEAMS

BACKGROUND

The present invention relates to method and apparatus for trimming flashing which forms when plastic members are fused together. More particularly, the present invention relates to method and apparatus for trimming flashing without the need for removing the joined members from the joining equipment and transporting the members to a remote trimming/polishing station.

High speed automatic equipment for joining frame components which have been cut to size and supplied to the equipment for fabricating a frame or a frame-like structure, are well known in the art.

The typical operation is to provide plastic frame members which have been processed preparatory to the joining operation to form a frame, for example. Although machines of this nature are capable of simultaneously joining substantially all four corners of a frame structure, a description will be given herein of the manner in which two frame members forming one corner of the frame structure are joined, it being understood that the other three corners are formed in a substantially identical manner and are also performed substantially simultaneously with the corner joining operation described hereunder.

The frame members, which have previously been precision mitred to form a corner, are placed in the machine, typically referred to as a conventional 4-point welder structure, are positioned within clamping devices and are moved towards one another so that the surfaces to be joined engage a locator plate which typically provides a gap of the order of one quarter inch (0.25") between the surfaces to be joined. The clamping assemblies clamp the frame members in place so that the surfaces to be joined extend a given distance beyond their clamping devices in a direction toward the opposite clamping device.

The clamping devices are then moved apart by an amount sufficient to enable the locator plate to be withdrawn. After the locator plate is withdrawn, a heated plate is placed in the gap region between the surfaces to be joined. The clamping devices then move the frame members towards one another causing the surfaces to be joined to engage opposing surfaces of the heated plate which heats the surfaces to be joined to a level sufficient to heat a marginal end portion of each frame member to a softened or molten state. This is accomplished by adjusting/controlling the temperature of the heated plate and the time interval during which the engaging surfaces of the frame member are in contact with the heated plate to achieve the desired molten state.

Thereafter, the clamping assemblies are moved to separate the frame members to enable the heated plate to be withdrawn. After the heated plate has been removed from the region between the heated, molten surfaces, the clamping members are moved to bring the heated molten, surfaces of the cooperating frame members into intimate engagement. This action causes the molten surfaces to fuse together as they undergo cooling. In addition, the bringing together of the frame members causes some of the molten material to be squeezed out from the region between the joined ends of the engaged frame members, whereby the molten material squeezed out from between the joined surfaces, forms an undesirable flashing.

After the frame members have cooled sufficiently, the frame is removed from the clamping assemblies.

The frame assembly is removed to a separate location from the four 4-point welding equipment to undergo trimming and polishing, necessitating: removal of the completed frame; transportation to a trimming/polishing station; clamping of the frame at the trimming/polishing station; and performing the trimming/polishing operations. In addition, the techniques presently used for trimming/polishing the flashing typically requires a large amount of manual labor to obtain frames having the desired clean, aesthetic appearance in the regions of the joined corners.

SUMMARY

The present invention is characterized by comprising method and apparatus for performing a trimming operation which takes place at the welding station and immediately following the welding operations, thereby significantly reducing the amount of handling required in the employment of conventional techniques while totally eliminating the need to transport frame assemblies requiring trimming operations to a second location for performance thereof. In addition the present invention is characterized by comprising method and apparatus for performing a trimming operation which provides a frame having a clean, aesthetically pleasing appearance in the regions of the mitred corners while eliminating the need for the labor intensive activities necessary when employing conventional techniques.

The present invention is characterized by comprising method and apparatus for mounting the trimming assembly directly upon an automated welder system, which may be a single point, two (2) point or four (4) point welder for joining frame members whose center line are perpendicular as well as joining members whose longitudinal center lines are parallel or form any angle therebetween, enabling the trimming operation to be performed while the joined members of the frame are still mounted in the automated welder, thereby totally eliminating the need for removal of the frame from the automated welder and transporting and mounting the frame upon appropriate trimming/polishing equipment.

More specifically, the apparatus of the present invention comprises guide blocks joined to the clamping assemblies of the welder equipment. The trimming apparatus comprises a pair of guide members which serve to guide reciprocally mounted trimming blades. Actuators are provided for each of the trimming blades for selective extension and retraction thereof. In addition thereto, a latching assembly is provided for selectively latching the guide blocks to one another to prevent their movement during the operation of the trimming blade(s),thereby assuring clean, effective trimming of the flashing which avoids the need for additional finishing/polishing. Latching activators are provided separately and independently of the trimming blade activators for selectively latching and delatching the guide block.

The activators may be electrically operated solenoids or hydraulic or pneumatic devices. In one preferred embodiment, the activators are pneumatically controlled activators forming a part of a pneumatic system for operating the latches at a first pressure level known as "shop psi" for operating the latches and moving the trimming blades in the retraction direction and being provided with a booster regulator for extending the trimming blades at a higher pressure level hereinafter referred to as a high psi.

The trimming system is preferably operated under control of a programmed logic controller (PLC) for automatically controlling the trimming system through a preprogrammed sequence and further automatically initiating operation responsive to control signals from the automated welder system, enabling operation of the trimming system in proper synchronizing and time relationship with the automated, welder equipment.

The guide blocks and cutting blades may be designed to accommodate a variety of different frame structures so as to provide trimming for frames of complex cross-section configurations as well as cross-sections of simple shapes having substantially flat external surfaces at the same time without interfering with the or complicating the design and operation of the welder equipment, enabling operation of the welder equipment without any design modifications to accommodate the trimming system.

The cooperating cutting blades may be operated to perform a variety of different combinations of cutting/shearing steps to perform a trimming operation which removes flashing from the joined ends of frames and the like to a degree sufficient to eliminate the need for any further trimming/polishing operations.

BRIEF DESCRIPTION OF THE DRAWINGS

The invention will be described in detail hereinbelow making reference to the drawings, in which:

FIGS. 10, 10b and 10c are front, side and top views of blade "4" in FIG. 6b.

FIGS. 11a and 11b are tables showing two possible programmed sequences of the trimming operations obtainable through the programmed logic controller of FIG. 1.

DETAILED DESCRIPTION OF THE PREFERRED EMBODIMENTS

Figure 1:
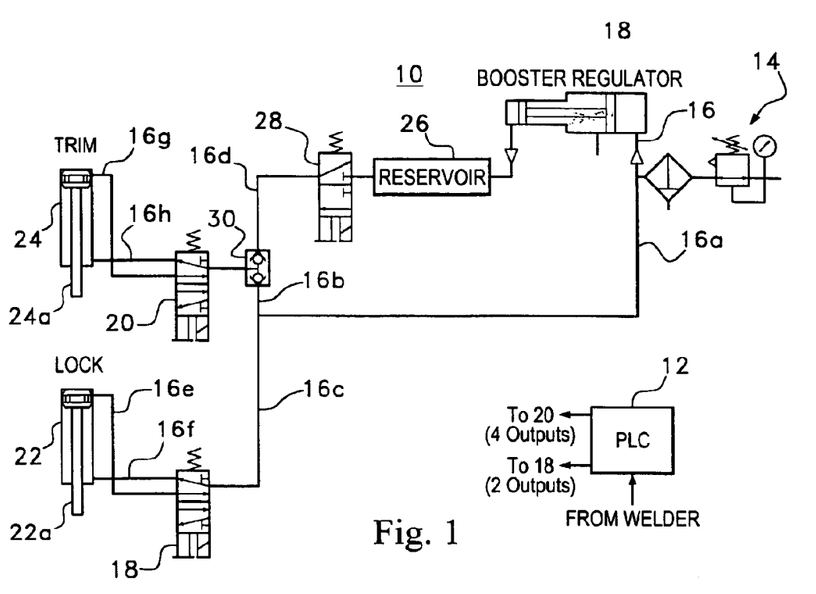
FIG. 1 is a simplified diagram showing the actuators for the trimming and locking operations and the programmed logic controller for operating the actuators in accordance with a pre-programmed sequence.

FIG. 1 is a simplified block diagram showing an actuator system 10 for selectively operating the reciprocating trimming knives and the locking mechanism. A programmable logic controller (PLC) 12 is programmed to operate the trimming and locking actuators in a predetermined sequence which can be modified according to the type of profile being trimmed.

A source 14 provides the desired "shop" pressure, typically of the order of 90 psi, which is coupled through line 16 to a booster regulator 18, and line 16a to 16b and 16c which are respectively coupled to solenoid-operated control valves 18 and 20 for respectively operating the fixture locking cylinder 22 and trimming blade cylinder 24.

The output of booster 18, which is of the order of 170 psi, is coupled to a safety valve 28 through reservoir 26. A pair of one-way valves provided in valve structure 30 prevent the pressure in high pressure line 16d from entering into low pressure line 16b, and vice versa.

The PLC 12 receives a signal from the 4-point welder, as will be more fully described, to initiate the operation of the trimming apparatus.

Figure 2:
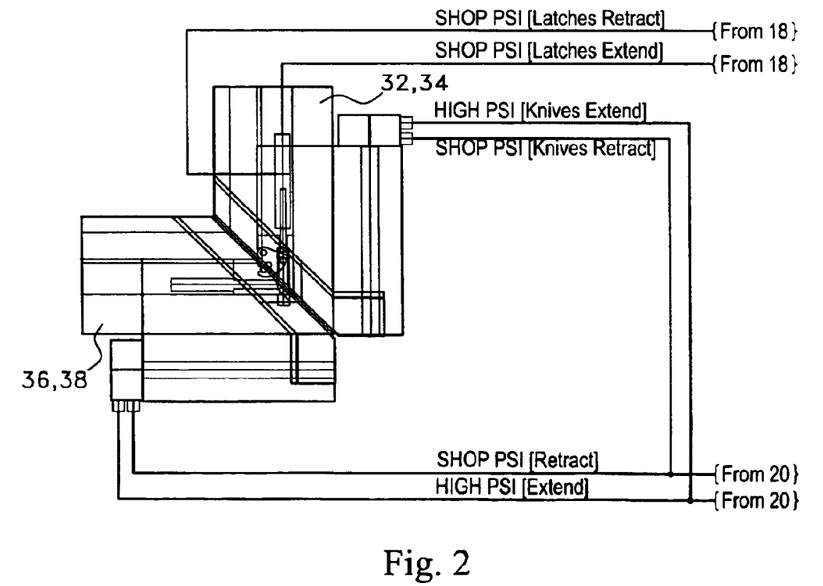
FIG. 2 is a plan view showing the fixtures for holding frame members to be joined and the pressure lines comprised thereof.
Figure 3A:
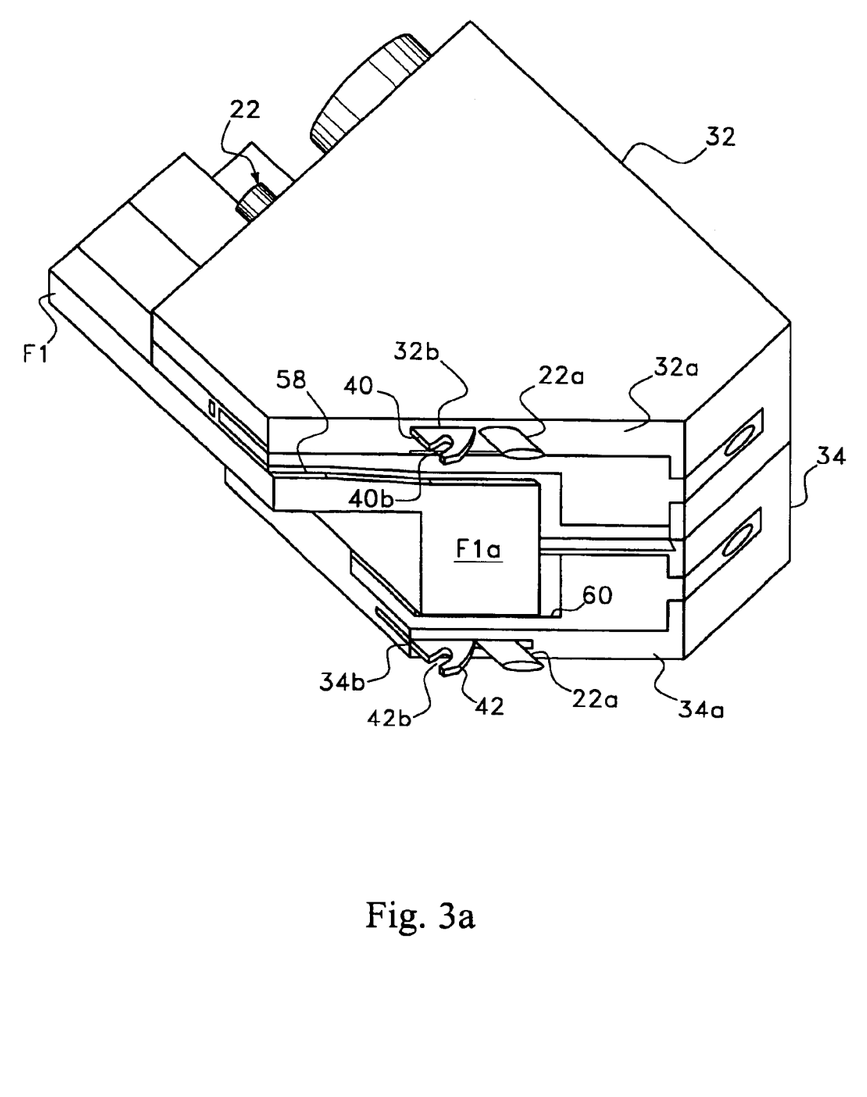
FIGS. 3a and 3b are perspective views showing the fixtures of FIG. 2 in greater detail.
Figure 3B:
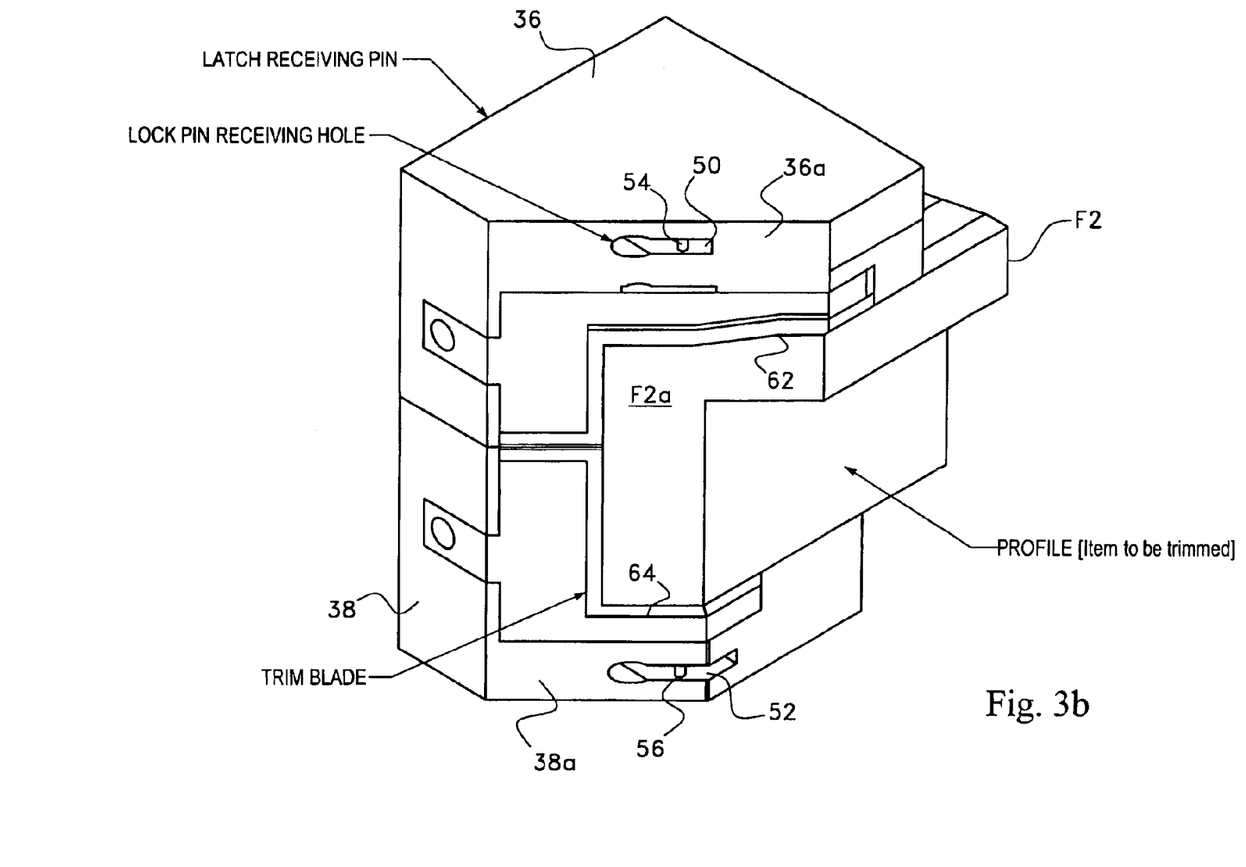
Figure 4:
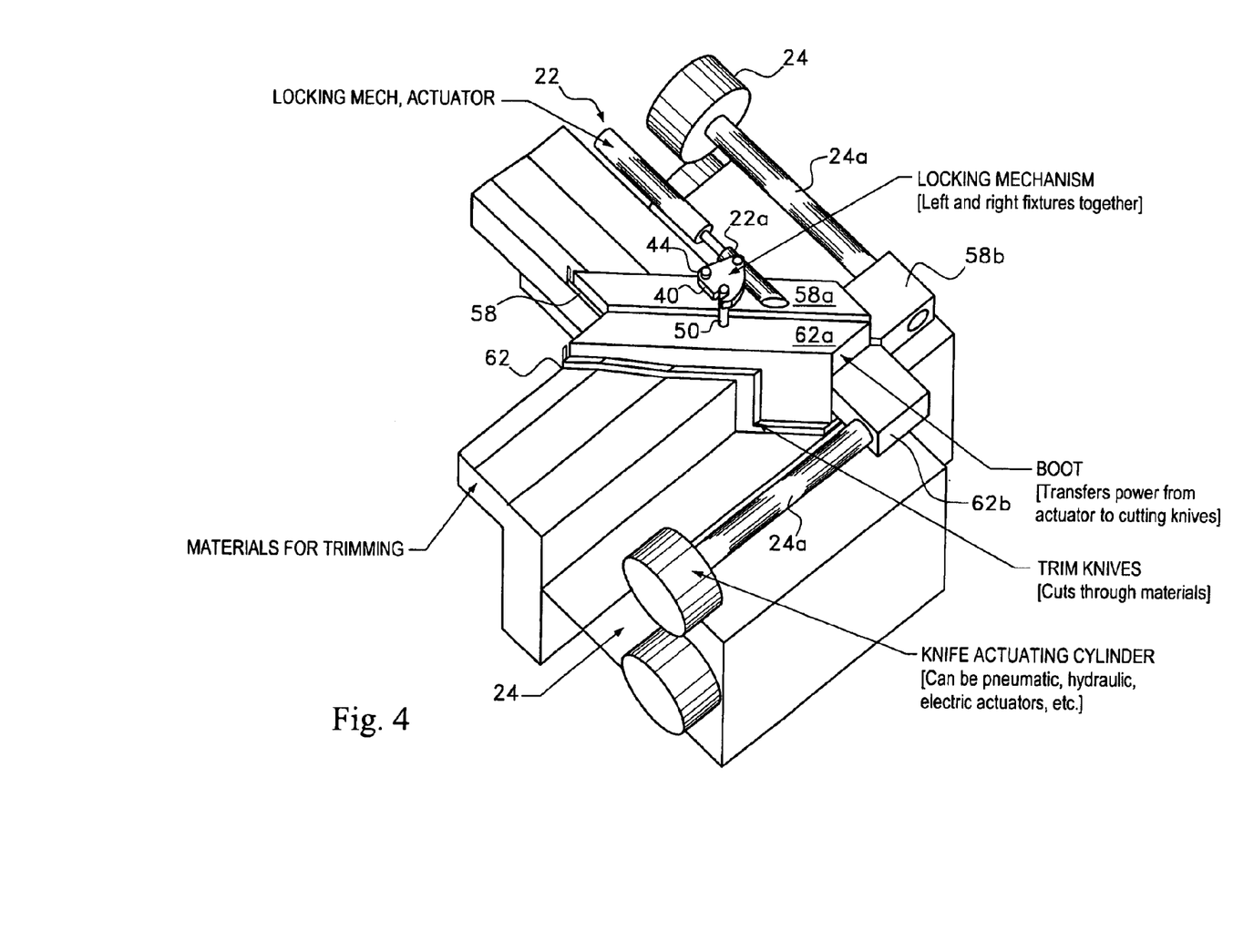
FIG. 4 is a perspective view of the fixtures of FIGS. 2, 3a and 3b with portions thereof removed to facilitate an understanding of the operations of the various actuators employed in the trimming system.

The cooperating fixtures are shown in FIGS. 3a and 3b separated from one another while FIG. 4 shows the fixtures in the trimming-ready position locked together in readiness for operation of the trimming blades. The upper and lower fixtures 32 and 34 embrace one of the frame members F1 therebetween and are each provided with diagonally aligned faces 32a and 34a which are arranged to be directly opposite the diagonally aligned faces 36a and 38a of the upper and lower fixture members 36 and 38, respectively, which receive a cooperating frame member F2. The fixtures 32–34 and 36–38 are arranged in the manner shown in FIGS. 2 and 4 and clamp the frame members F1 and F2 in the manner shown so that their cooperating surfaces to be joined are arranged in spaced, parallel fashion and are maintained in this alignment throughout the welding and trimming operation. The end surfaces of frame members F1 and F2 protrude of the order of 0.25 inches beyond the end surfaces of their associated fixtures. Each upper and lower fixture 32 and 34 is provided with an elongated slot 32b, 34b for slideably receiving and guiding a locking actuator 22 as shown in FIG. 1, as well as a swingably mounted locking plate 40 and 42. Each locking plate is mounted to pivot about a pivot pin 44, only one of which is shown in FIG. 4 and in FIG. 5 and is swingable between a retracted position 40' shown in dotted fashion and a locking position 40 shown in solid line fashion in FIG. 5. Other locking techniques may be used to restrain the fixture from moving during operation of the trimming blades. For example, making reference to FIG. 5, the plate 40 of FIG. 5, may enter into slot 50 in upper fixture 36 and containing pin 54. Plate 40 may have an opening for receiving pin 54 in the slot of fixture 32. As the two fixtures 32 and 36 move together, the locking plate 40 may move over pin 54. Cylinder 22 operates by extending piston rod 22a causing the end portion of the piston rod to press locking plate 40 downwardly causing pin 54 to enter the opening in plate 40 and thereby lock fixtures 32 and 36 against movement during the trimming operation.

Figure 5:
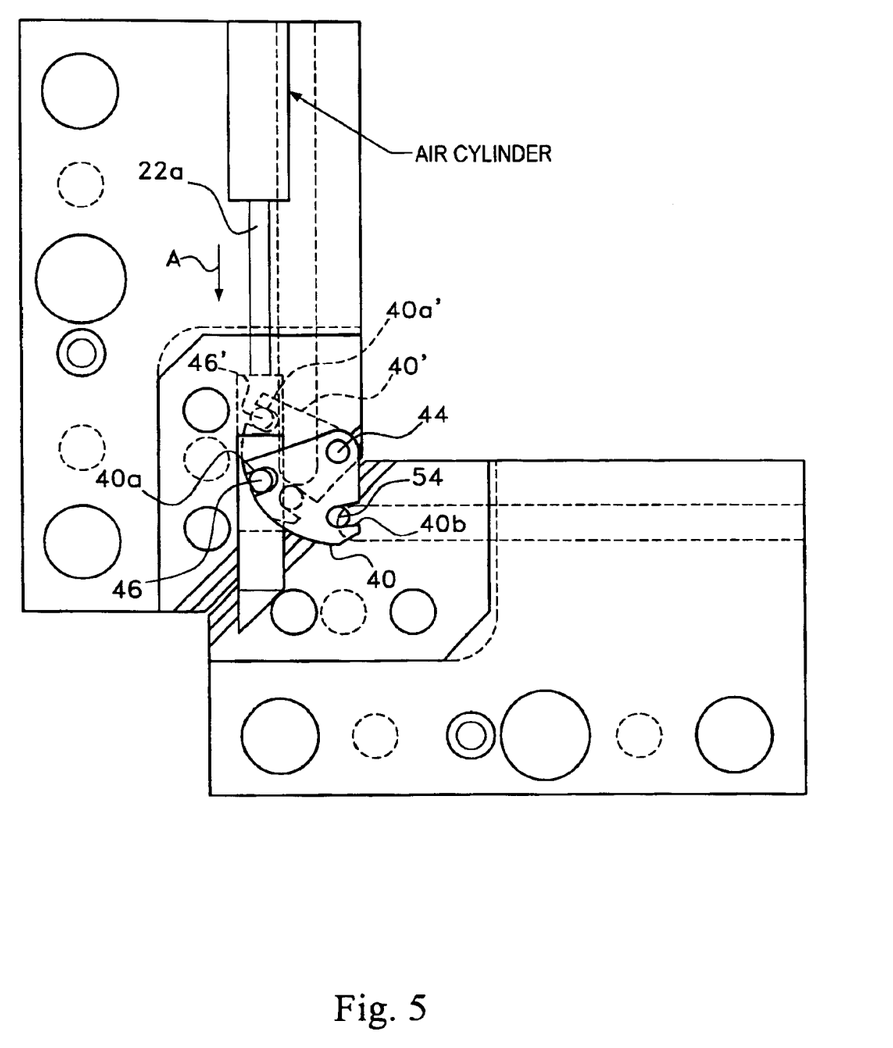
FIG. 5 is a top plan view showing the locking system in greater detail.

Locking plate 40 of FIGS. 4 and 5, for example, is swung about pivot 44 by means of a pin 46 on piston arm 22a which is received within a slot 40a provided in locking plate 40. The fixture locking actuator cylinder 22 shown in FIGS. 1, 3a, 4 and 5, drives piston arm 22a in the direction of arrow A to move locking plate 40, by pin 46, in a counter clockwise direction about pivot pin 44, as shown in FIG. 5 so as to reach the locking position. As was mentioned hereinabove, the shop pressure (typically 90 psi) enters into cylinder 22 through line 16e under control of the solenoid operated valve 18 when in a first state. Piston 22a is retracted by operating solenoid controlled valve to move to a second state to apply shop pressure to cylinder 22 through line 16f causing the blocking plate 40 to occupy the dotted line position 40' shown in FIG. 5.

The upper and lower fixtures 36 and 38 shown in FIG. 3b are each provided with elongated slots 50 and 52 which slidably receive the free ends of the pistons 22a and also receive at least a portion of the locking plate 40. Each of the slots 50 and 52 is provided with a locking pin 54, 56 which cooperates with locking slot 40b in each locking plate 40. FIG. 4 shows a portion of the upper fixture 32 removed to expose the locking mechanism actuator cylinder 22 and showing the piston 22a in the extended state, causing the locking plate 40 to be pivoted into the position where its slot 40b captures the pin 5A shown in FIG. 3b, the locking position being shown best in FIGS. 4 and 5.

It should be understood that the upper fixtures 32 and 36 are locked to one another and that the lower fixtures 34 and 38 are locked to one another, the lower locking fixture assembly being substantially identical in design and function to the upper locking fixture description described hereinabove. The locking mechanism prevents the fixtures from moving relative to one another when the trimming blades are operated to prevent the frames being joined from experiencing any movement during trimming of the flashing and also to prevent the cooperating fixture members from moving during the trimming operation, thereby providing a trimming operation which completely removes the flashing, thus avoiding the need for any further trimming and/or polishing operations.

The locking mechanism actuating cylinders 22 are operated to retract the pistons 22a upon completion of the trimming operation to enable separation of the fixtures preparatory to removal of the joined frame members.

Figure 6A:
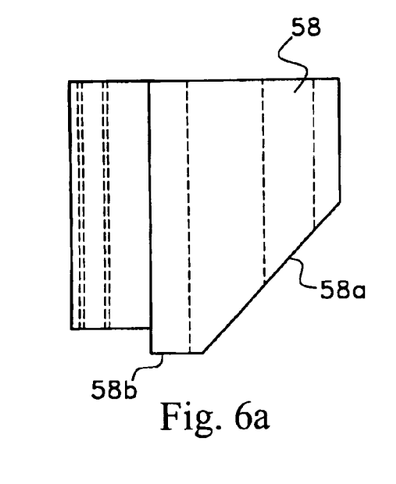
FIGS. 6a and 6b respectively show a top plan view and an end view of a shoe holding four (4) trimming blades.
Figure 6B:
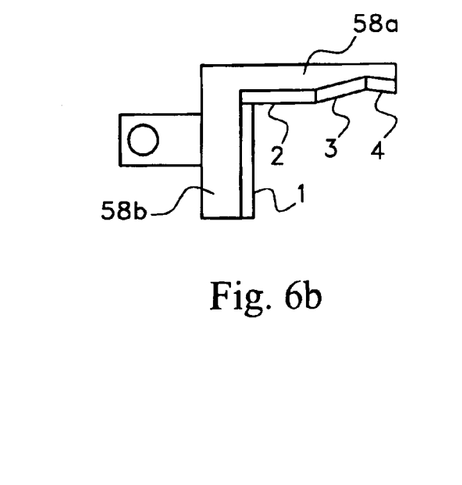
Figure 7A:
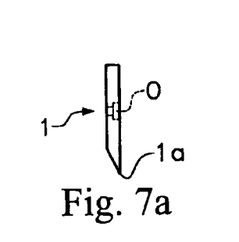
FIGS. 7a, 7b and 7c are front, side and top views of blade "1" in FIG. 6b.
Figures 7B, 7C:
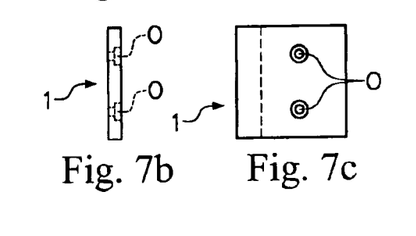
Figures 8A, 8B, 8C:
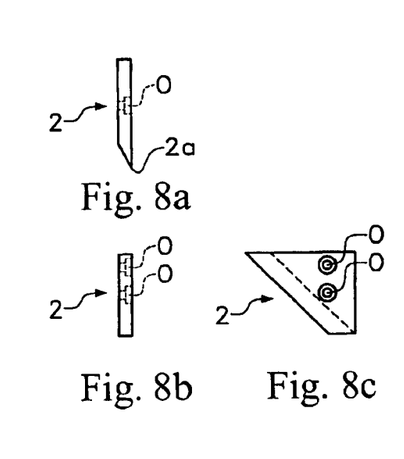
FIGS. 8a, 8b and 8c are front, side and top views of blade "2" in FIG. 6b.
Figure 9A:
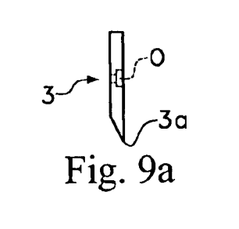
FIGS. 9a, 9b and 9c are front, side and top views of blade "3" in FIG. 6b.
Figure 9B:
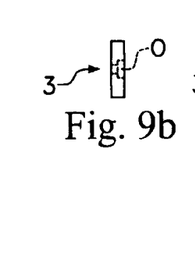
Figure 9C:
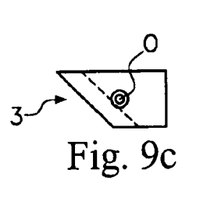
Figures 10A, 10B, 10C:
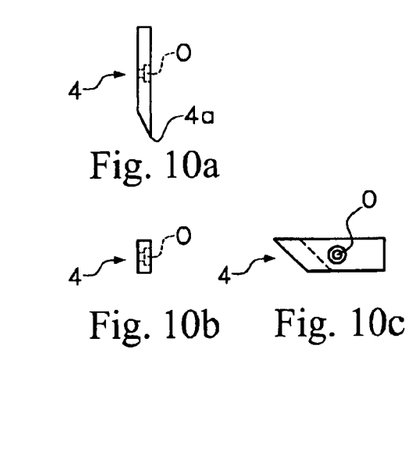
Figure 12A:
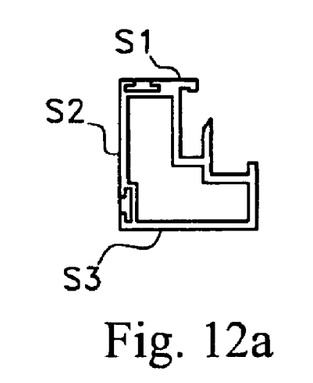
FIGS. 12a–12d are cross sections of the different profiles of frame members capable of being joined and trimmed employing the system of the present invention.
Figure 12B:
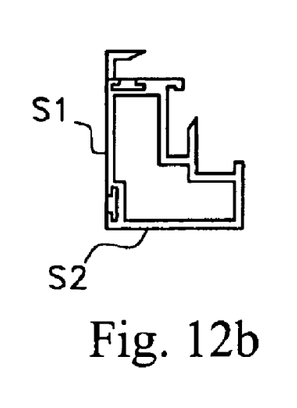
Figure 12C:
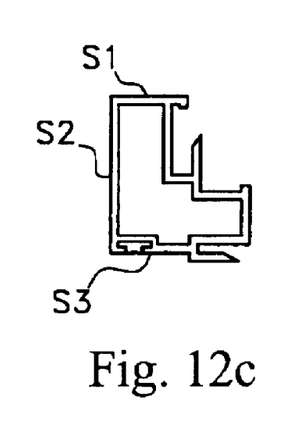
Figure 12D:
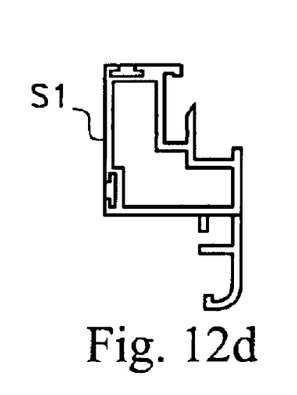

Each of the fixtures 32, 34, 36 and 38 is provided with a reciprocating trimming blade assembly 58, 60 shown in FIG. 3a and 62, 64, shown in FIG. 3b. Each trimming blade assembly has its blades joined to a boot B, each boot having a projection which is driven by an associated trimming cylinder 24. FIGS. 6a and 6b are top and front end views of a boot holding four (4) trimming blades 1, 2, 3, and 4, which are secured to the boot B by suitable fastening screws (not shown). FIGS. 7a–10c show front, side and top views of blades 1–4. Openings O in the blades 1–4 receive the aforementioned fasteners for securement to boot B. The cutting edges 1a–4a are arranged along the edges of the boot B. A plurality of blades are employed to trim flashing in the embodiment of FIGS. 6a, 6b. Blades may be provided to trim flashing from outside corners. Surfaces S1, S2, etc. of the more complex frames of FIGS. 12a to 12c are the surfaces trimmed by the trimming blades. It should be understood that the number, sizes and configurations of the blades are a function of the surfaces of the frames to be trimmed and may be easily designed/modified to accommodate different profiles whether simple or complex.

FIG. 2 shows a simplified plan view of one corner trimming assembly showing the pneumatic lines coupled thereto for activating the latching and trimming assemblies.

FIG. 3a is a perspective view showing a portion of the trimming assembly of FIG. 2 which incorporates the latching hook and the pneumatic activators therefor.

FIG. 3b is a perspective view showing the latching assembly portion which cooperates with that shown in FIG. 3a and having the latch receiving slot for receiving the latching hook which is latched to the pin provided in the slot.

FIG. 4 shows portions of the upper fixtures 32 and 36 removed, exposing the trimming actuator cylinders 24 the boots 58a, 62a and the boot projections 56b and 62b. Each of the trimming actuator cylinders 24 is provided with a piston 24a, each piston having its free end coupled to the associated boot projection 58b, 62b. Making reference to FIGS. 1 and 2, solenoid operated valve 20, in a first position, couples the high pressure line 60d to line 16g causing the piston 24a to be extended, driving the associated trimming blade toward the trimming/cutting position. When the solenoid operated valve 20 is moved to a second state, compressed air at shop psi (typically 90 psi) is coupled to cylinder 24 through line 16h retracting the associated trimming blade at the lower pressure level.

Although FIG. 1 shows only a single trimming actuator cylinder 24 and locking actuator cylinder 22, it should be understood that two locking activating cylinders 22 are provided at each corner assembly comprised of upper and lower fixtures as shown in FIGS. 3a and 3b and that four trimming actuating cylinders are provided at each corner for selective operation of the trimming knives 58, 60, 62 and 64.

A typical operating sequence will now be described. Initially, the welding operation takes place prior to the trimming operation. It should be understood that the welding operation may comprise equipment for fusing all four corners of a frame or alternatively for fusing only one corner, it being understood that the present invention may be utilized with equal success and efficiency in either single corner or four corner fusing equipment as well as 2 or 3 corner point welding units.

The operation of the joining of two frame members at one corner will be described herein for purposes of simplicity, it being understood that the welding and trimming operations that are not shown are substantially identical in design and function.

The frame members F1 and F2 to be joined are respectively placed between the fixture pairs 32–34 and 36–38. Although not shown for purposes of simplicity, it should be understood that suitable clamping means that such as hydraulically or pneumatically operated clamping pistons or electrically operated solenoids urge the cooperating fixtures 32–34 and 36–38 toward one another to suitably clamp the frame member F1 and F2 therebetween.

A locator plate, not shown for purposes of simplicity, is extended into the region between the fixture pairs 32–34 and 36–38 and the fixtures are closed into the locator plate. The members being joined are inserted into the fixtures and the clamping actuators clamp the frame members in place. As is conventional, the processed ends F1a and F2a of the frame members of F1 and F2 are arranged by the locator plate so as to extend slightly beyond the end faces of the fixtures. For example, the mitred end of frame member F1 is arranged to extended preferably about $\frac{1}{8}^{th}$ of an inch beyond faces 32a and 34a for fixtures 32 and 34. Frame member F2 has its processed surface F2a extending a similar distance beyond the faces 36a and 38a of fixtures 36 and 38. These distances may be modified according to the materials being joined, as well as other factors.

With the frame members in this position and locked in place, the fixtures are moved apart and the locator plate is retracted. The heating plate is then extended into the gap between the mitred end surfaces and the fixtures are moved towards one another causing the end surfaces to make contact with the heated plate in order to melt the end portion of each frame member for a period sufficient to render the plastic material softened or molten. The ends of the frame members F1 and F2 are typically maintained in contact with the heat plate for approximately 20 seconds. The heat plate is typically maintained at a temperature of 450° F. when joining frames formed of PVC, for example, which is used for storm windows and the like. Other materials may require different temperatures and different dwell times according to the material being used. For example, resilient gaskets used in refrigerators for sealing a refrigerator door, require less heat to soften the material sufficient for fusing two joined pieces.

Thereafter, the fixtures are moved apart and the heat plate is retracted from the region between the fixtures. The fixtures are then moved into an engaged position joining the heated, molten ends of the frame members. The members are maintained in this fusion position for about 20 to 25 seconds, allowing the frame members to be fused together and cooled.

In the present invention, the PLC 12 takes the signal from the welder assembly which may be signals provided to 24 volt dc solenoids employed in conventional welder machines.

Figure 11A:
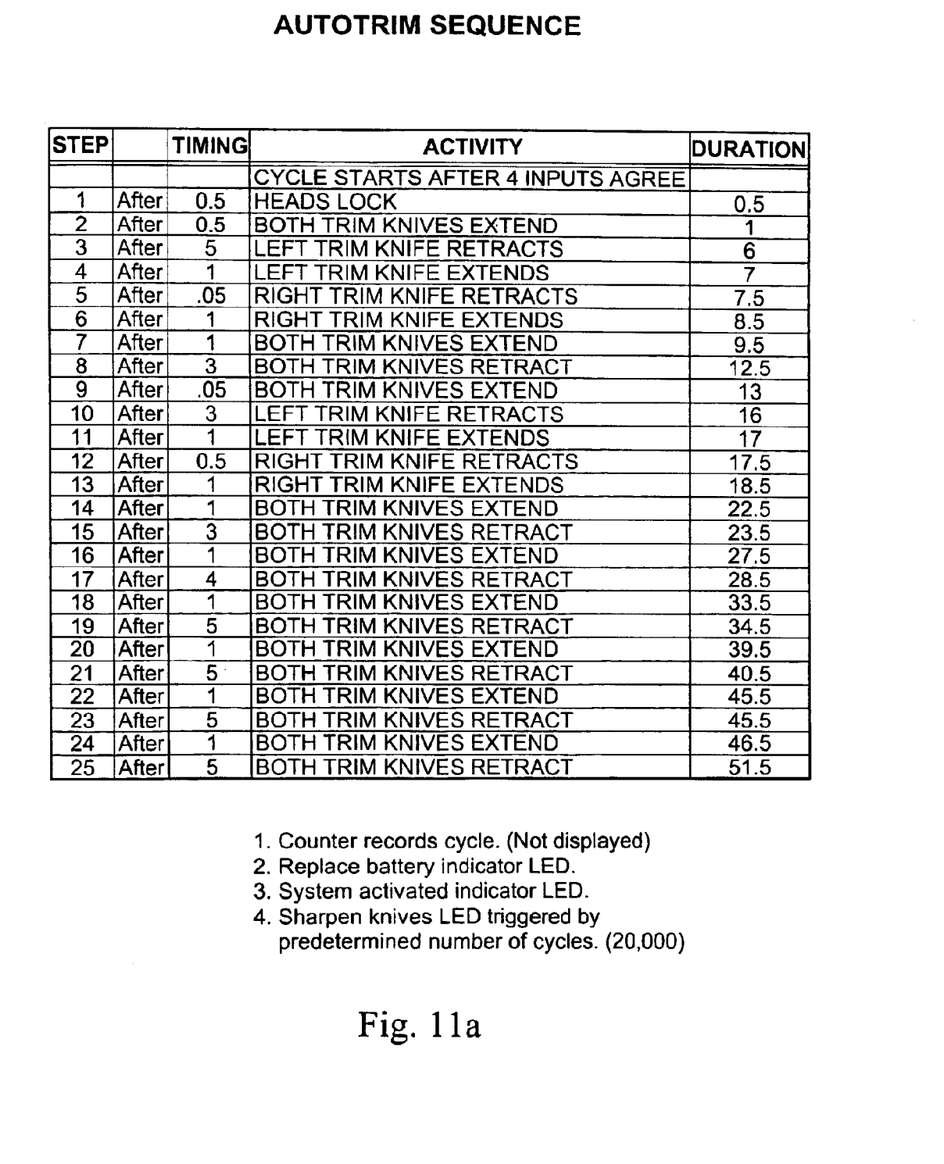

The trim cycle begins whereby PLC 12, upon receipt of the appropriate signal from the welder, operates the solenoid controlled valves 18 causing the valves to couple the "shop" psi to the line 16e of the locking mechanism actuator cylinder 22 whereupon the piston arms 22a are extended causing the latching plates 40 and 42 to enter into the cooperating slots 50 and 52 in fixtures 36 and 38 (see FIG. 3a and 3b) whereby the slot 40b in the upper latching plate 40 and 42b in the lower latching plate 42 move into the locking position with the associated locking pins 54 and 56, the manner in which the cooperating locking pin 54 is received within slot 40b of locking plate 40 being shown best in FIG. 5. Once the locking plates are in the locking position, the trimming operation can now be initiated. FIG. 11a shows a table of one trimming sequence comprised of 25 steps. The headings of the five columns reading from left to right are the step numbers; relationship of each step to the prior step (i.e. is it before or after); the timing of each step; the activity of each step and the total time elapsed.

Making reference to the table shown in FIG. 11a, initially the heads lock (step 1) and thereafter actuating cylinders 24 are activated whereby the higher psi is applied to the lines 16g causing both pairs of trimming blades, i.e. the upper pair of assemblies 58–62 and, simultaneously therewith the cooperating lower pair of trimming knife assemblies 60–64 provided in the lower fixtures 34–38, to be extended (step 2).

At step 3 the left trimming knife of each trimming pair, i.e., the trimming knives of assemblies 58 and 60 of fixtures 32 and 34, are retracted at the lower psi. At step 4 the left trimming knives of assemblies 58 and 60 are then extended. At step 5, the right trimming knives i.e. the trimming knives of assemblies 62 and 64 of the upper and lower fixtures 36 and 38 are retracted at the lower psi and then at step 6 they are extended at the higher psi. By retracting and extending the trimming blade assemblies 58–64 through a number of different steps, this assures the complete removal of the flashing. The number of steps typically may vary in accordance with the nature of the members and/or materials being fused. For example, when making gasket frames formed of a resilient compressible material, it has been found that such materials require a lesser number of steps to perform a trimming operation. Thus, according to the material, the program is selected which removes the flashing without the need for further removal by cutting by hand and/or polishing.

In addition to operating the trimming blades so as to open and close simultaneously or so as to hold one blade closed while the other is repeatedly opened and closed, a shearing operation may be performed by holding one of the cooperating blades of each blade pair in a retracted position and repeatedly extending and retracting the other blade of the blade pairs. For example, the right hand blades 62 and 64 (FIG. 3b) may be held in the retracted position while blades 58 and 60 are repeatedly retracted and extended, causing a shearing action whereby the blades 58 and 60 move to a position to shear and cut through the flashing formed at the jointure of the two joined frame members.

The shearing sequence may be alternated whereby the left-hand blades of assemblies 58, 60 perform shearing while the right-hand blades of assemblies 62 and 64 are retracted and the blade assemblies then reverse their operations so that the left-hand blades of assemblies 58 and 60 are retracted while the right-hand blades 62 and 64 perform the shearing operation.

The program of FIG. 11b provides for repeated shearing operations where one blade assembly is retracted while the cooperating blade assembly is extended. See steps 3–5; 21–23 and 27–29, for example, in addition to both extending and retracting at the same time. A variety of different combinations of cutting and shearing operations may be performed depending typically upon the nature of the material being trimmed.

In the example given, the frame members have a fairly regular shape. It should be understood that the fixture and blades of the present invention may be provided with any desired configuration so as to conform to the profile of the frame members being joined and trimmed. For example, the frame profiles may be quite simple such as a gasket having substantially flat surfaces or maybe a frame for a window such as a storm window and have a much more complicated frame profile, as shown by the different profiles of FIGS. 12a to 12d.

It can be seen that the present invention provides a novel apparatus and method for trimming plastic frame members and the like, and which is utilized in conjunction with conventional welding apparatus enabling the trimming operation to be performed while the frame members are retained at the welding apparatus thus eliminating the need for removing the fused frame members and relocating them to a separate independent apparatus. Although the preferred embodiment is directed to joining frame members, it should be understood that the trimming apparatus of the present invention may be used to trim any joined plastic members, regardless of their orientation and may be used to trim members whose center lines are arranged to be parallel, perpendicular or any angle there between.

In addition to the trimming apparatus embodiment described hereinabove, the present invention may be adapted for use in trimming joining members, such as, but not limited to, frame members and utilized with heating/fusing/joining apparatus capable of performing heating/fusing/joining operations on a single stack or frame or on multiple stacks of frames, simultaneously.

Figure 13A:
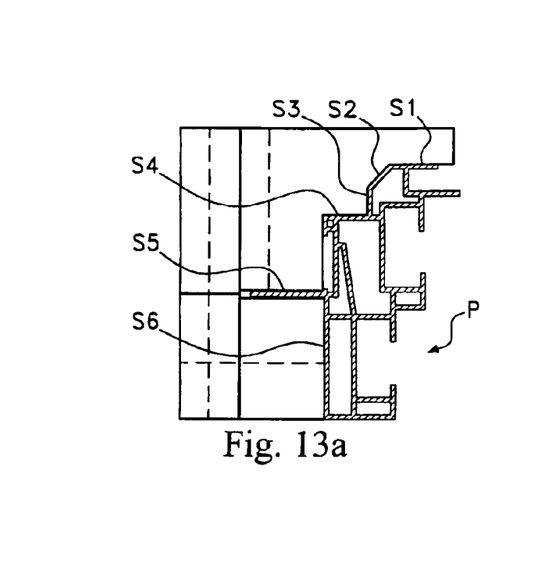
FIGS. 13a–13c are cross sections of other profiles of frame members capable of being trimmed by the system of the present invention, and respectively showing trimming apparatus adapted for use in trimming a single stack, a double stack and a four-high stack of profiles.

For example, the embodiment shown in FIG. 13a, as well as the embodiment of FIGS. 3 and 3a are utilized for trimming a single stack of profiles.

FIG. 13a shows a somewhat complex "right-hand" profile P arranged in a suitable clamping fixture F to be joined to a "left-hand" profile, not shown for purposes of simplicity. For example, the fixture 32, 34 of FIG. 2 is assumed to hold the "left-hand" profile and the fixture 36, 38 is assumed to hold the "right-hand" profile when viewing FIG. 2 from the left-hand side of FIG. 2. The surfaces to be trimmed are S1–S7.

Figure 13B:
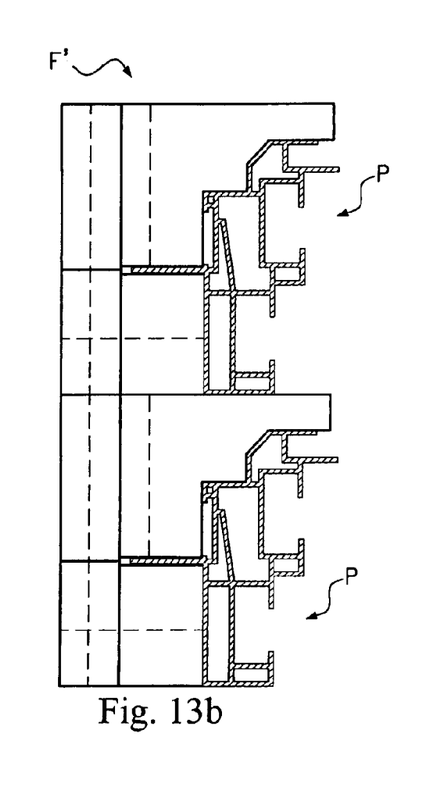

Heating/fusing/joining structures are also available which are capable of simultaneously operating on a stack of two (2) or more members. For example, FIG. 13b shows two identical "right-hand" profiles P arranged in a suitable clamping fixture F' in which the profiles P, similar to that shown in FIG. 13a, to be joined to "left-hand" profiles are arranged stacked one upon the other. Thus, for example, a single point or multiple point welder capable of joining frame members of two frames stacked one upon the other, may be utilized with the present invention to thereby simultaneously trim two stacked frame members which have been joined.

Figure 13C:
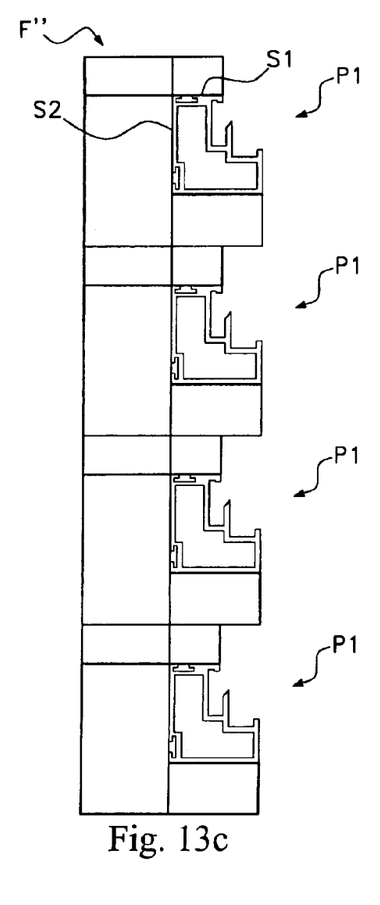

Single or multiple point welders are not limited to joining double stacks and may be utilized to join multiple stacks greater in number than two. For example, FIG. 13c shows a "quad" stack in which four (4) "right-hand" profiles P1 are arranged stacked one upon another in a frame assembly F" for joining with four(4) cooperating "left-hand" profiles. The trimmer arrangement of the present invention may trim surfaces S1–S3 of the "quad" stack of profiles P1, the actual number of stacked profiles to be trimmed being a function of the single or multiple point welding apparatus as to whether it is capable of handling a single stack or multiple stacks of profiles.

It should be understood that the "right profiles" for single, double or quad stacks are held by clamping fixtures similar to those respectively shown in FIGS. 13a–13c.

What is claimed is:

1. A method for trimming flashing from joined first and second plastic members comprising the steps of:
   (a) providing first and second clamps;
   (b) clamping the first and second plastic members between first and second clamps;
   (c) heating surfaces of said first and second plastic members to be joined sufficient to soften said surfaces;
   (d) moving the first and second clamps in a direction to bring said heated, softened surfaces of said members into engagement causing fusion of the members in the region of the heated softened surfaces, whereby a portion of the heated material is forced out from between the engaging surfaces to form flashing;
   (e) affixing guides each having one of a pair of cutting blade assemblies mounted therein and slidable independent of said clamps to said clamps; and
   (f) latching the guides to one another;
   (g) imparting movement to said pair of cutting blade assemblies guided by said guides to move the cutting assemblies in a direction transverse to the heated surfaces and independently of said clamps to thereby move the blade assemblies from a spaced apart position, whereby the flashing lies in a gap between spaced apart blades of said blade assemblies, toward an engaged position of said blades to thereby trim said flashing.

2. The method of claim 1 wherein step (g) is performed a given time after step (d), said given time interval being sufficient to enable fusion of said heated, softened end portions.

3. The method of claim 2 further including initiating step (g) approximately 15 to 30 seconds after step (d).

4. The method of claim 1 further comprising:
   (h) separating the blade assemblies after performance of step (g) while maintaining the first and second members in the clamped condition.

5. The method of claim 4 further comprising:
   (h) performing steps (f) and (g) a plurality of times.

6. The method of claim 1 wherein step (g) further comprises moving one of said trimming blades so as to shear the flashing.

7. The method of claim 1 wherein step (g) further comprises:
   (h) retracting one of said pair of blades away from said flashing; and
   (i) extending another one of said pair of blades to move the extended blade across the region of the flashing for shearing the flashing.

8. The method of claim 7 further comprising reversing the extending and retracting operations in steps (h) and (i) of said pair of blades so that said one of said pair of blades performs a shearing operation on said flashing while said another one of said pair of blades is retracted.

9. The method of claim 8 wherein the shearing operations of the pair of blades is reversed a plurality of times.

10. Apparatus for trimming flashing from joined first and second plastic members comprising:
    a pair of cooperating fixtures for clamping the first and second plastic members;
    means for heating surfaces of said first and second members to soften the surfaces to be joined sufficient to enable said surfaces to be fused;
    fixture actuators for moving the first and second members in a direction to bring heated, softened surfaces of said members into engagement, causing fusion of the members at the heated softened surfaces, whereby a portion of the heated material is forced out from between the engaging surfaces to form flashing;
    said clamps having guide surfaces;
    a pair of cutting blade assemblies movable along said guide surfaces; and
    trimming actuators for moving said pair of cutting blade assemblies along said guide surfaces to move the cutting assemblies in a first direction transverse to the heated surfaces to thereby move the blade assemblies from a spaced apart position whereby the flashing lies in a gap between spaced apart blades of said blade assemblies and a second direction toward an engaged position of said blades to thereby trim said flashing; and
    a locking mechanism for locking said guides to one another before said trimming actuators are operated.

11. The apparatus of claim 10 wherein said trimming actuators are operated at a given time and after fixture actuators move the first and second plastic members into engagement, said given time being sufficient to enable fusion of said heated end portions.

12. The apparatus of claim 11 wherein said given time is in the range of from 15 to 30 seconds.

13. The apparatus of claim 10 wherein said locking apparatus comprises a member on one of said fixtures movable between a locking engagement position with a pin on the other one of said fixtures and displacement position displaced from said pin.

14. The apparatus of claim 10 wherein each said locking apparatus comprises a locking pin on one of said fixtures and a locking plate movably mounted on another one of said fixtures; and
    a locking actuator for moving said locking plate in a first direction to capture said locking pin in a locking slot in said locking plate and in a second direction to displace the locking slot from the locking pin.

15. The apparatus of claim 14 wherein said locking plate is mounted to rotate about a pivot pin; and said locking plate having a driving slot receiving a driving pin operated by said locking actuator, said locking actuator selectively driving said locking plate in said first direction whereby the locking pin is captured by said locking slot and in a second direction opposite said first direction for displacing said locking slot from said locking pin.

16. The apparatus of claim 10 wherein said trimming actuators are pneumatic actuators;

first and second pneumatic pressure sources for respectively providing low and high output pressure at their outputs; and trimming control valves for respectively coupling said trimming actuators to said first pneumatic pressure source when in a first state and for coupling said trimming actuators to said second pneumatic pressure source when in a second state.

17. The apparatus of claim 16 wherein said first pneumatic pressure source is a compressor pump.

18. The apparatus of claim 16 wherein said second pressure source is a booster pump for boosting the output pressure of said first source to said higher pressure.

19. The apparatus of claim 16 wherein the output pressure of said first pressure source is of the order of 90 psi.

20. The apparatus of claim 16 wherein the output pressure of said second pressure source is of the order of 170 psi.

21. The apparatus of claim 16 further comprising outputs of said first and second pneumatic pressure sources being coupled to a common line through a pair of one-way valves to prevent the outputs of the first and second pressure sources from being fed back to the respective outputs of said second and first pressure sources.

22. The apparatus of claim 10 further comprising clamping actuators for clamping a frame member between said fixtures when in a first state and for releasing clamping pressure from said fixtures when in a second state.

23. The apparatus of claim 21 wherein said common line is selectively coupled to one of a first and a second port of said trimming actuator to respectively extend and retract the associated trimming blades.

24. The apparatus of claim 14 further comprising a programmed logic controller for controlling the locking actuator and trimming actuators according to preprogrammed sequence.

25. The apparatus of claim 14 wherein said latching actuator is a pneumatic actuator;

first and second pneumatic pressure sources for respectively providing low and high output pressure at their outputs; and latching control valves for respectively coupling said latching actuator to said first pneumatic pressure source when in a first state and for coupling said latching actuator to said second pneumatic pressure source when in a second state.

26. A method for trimming flashing from first and second joined plastic members comprising the steps of:

(a) arranging multiple stacks of first and second plastic members;

(b) providing cooperating clamps for damning said stacks;

(c) clamping first and second plastic members of each of said stacks between said cooperating clamps;

(d) softening surfaces of said plastic members to be joined by heating;

(e) moving said clamps in a direction to bring the heated, softened surfaces of said members into engagement causing fusion of the members in the region of the heated softened surfaces, whereby a portion of heated softened material is forced out from between the engaging surfaces, forming flashing;

(f) affixing guides to each set of clamps;

(e) providing cutting blade assemblies for each set of clamps;

(h) imparting movement to each set of cutting blade assemblies each being guided by an associated one of said guides to move the cutting assemblies in a direction transverse to the heated surfaces to thereby move the blade assemblies from a spaced apart position, whereby the flashing lies in a gap between spaced apart blades of said blade assemblies, toward an engaged position of said blades to thereby simultaneously trim the flashing of each of the members clamped by said sets of clamps; and (i) locking said sets of clamps preparatory to performing step (h).

27. Apparatus for trimming flashing from a stack of a plurality first and joined plastic members comprising:

means for clamping said stack between cooperating clamps;

means for softening surfaces of said first and second members to be joined by heating;

means for moving the clamps in a direction to bring heated, softened surfaces of said first and second members into engagement causing fusion of the first and second members in the region of the heated softened surfaces, whereby a portion of heated softened material is forced out from between the engaging surfaces, forming flashing;

said clamps being provided with guides;

cutting blade assemblies provided for said cooperating clamps, each cutting blade assembly each being guided by an associated one of said guides;

means for moving the cutting blade assemblies in a direction transverse to the heated surfaces to thereby move the blade assemblies from a spaced apart position, whereby the flashing lies in a gap between spaced apart blades of said blade assemblies, toward an engaged position of said blades to thereby simultaneously trim the flashing of each of the first and second members clamped by said cooperating clamps; and means for locking said cooperating clamps preparatory to operating said means for moving said blade assemblies.

28. The apparatus of claim 10 wherein each blade assembly comprises a plurality of blades each adapted to trim one of a plurality of surfaces of said members.

29. The apparatus of claim 27 wherein each blade assembly comprises a plurality of blades each adapted to trim one of a plurality of surfaces of said members.

30. Apparatus for trimming flashing from joined first and second plastic members, comprising:

a pair of cooperating fixtures for clamping the first and second plastic members;

heating means for softening ends of said first and second plastic members to be joined;

fixture actuators for moving the first and second members in a direction to bring the heated, softened ends of said first and second members into engagement, causing fusion of the members at the heated softened ends, whereby a portion of the heated material is forced out from between the engaging first and second plastic members to form flashing extending along a plurality of side surfaces adjacent to said joined ends;

at least one of said clamps having a guide surface;

at least one cutting blade assembly movable along said guide surface; and a trimming actuator for moving said cutting blade assembly along said guide surface in a first direction transverse to the heated ends to thereby move the blade assembly to a position displaced from the flashing and a second direction across the joined ends to thereby trim said flashing;

said blade assembly comprising means for trimming flashing adjacent a plurality of side surfaces of said first and second members.

31. The apparatus of claim 30 wherein said means for trimming comprises:

a boot having blade mounting surfaces each conforming to one of said side surfaces; and a plurality of blades each mounted on one of said blade mounting surfaces and movable along an associated one of said side surfaces for trimming flashing adjacent said side surfaces.

32. The apparatus of claim 30 wherein said means for trimming trims flashing adjacent to at least three (3) side surfaces.

* * * * *